United States Patent
Pirotte et al.

(10) Patent No.: US 9,656,518 B2
(45) Date of Patent: May 23, 2017

(54) OPTIMISED TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Pascal Pirotte, Clermon-Ferrand (FR); Jean-Claude Faure, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 307 days.

(21) Appl. No.: 14/415,542

(22) PCT Filed: Jun. 11, 2013

(86) PCT No.: PCT/EP2013/062026
§ 371 (c)(1),
(2) Date: Jan. 16, 2015

(87) PCT Pub. No.: WO2014/012713
PCT Pub. Date: Jan. 23, 2014

(65) Prior Publication Data
US 2015/0202924 A1 Jul. 23, 2015

Related U.S. Application Data

(60) Provisional application No. 61/715,996, filed on Oct. 19, 2012.

(30) Foreign Application Priority Data

Jul. 20, 2012 (FR) ...................... 12 57045

(51) Int. Cl.
*B60C 1/00* (2006.01)
*B60C 11/00* (2006.01)
(Continued)

(52) U.S. Cl.
CPC .............. *B60C 3/04* (2013.01); *B60C 11/005* (2013.01); *B60C 11/0083* (2013.04);
(Continued)

(58) Field of Classification Search
CPC . B60C 11/00; B60C 11/0008; B60C 11/0041; B60C 11/005; B60C 13/00; B60C 3/00; B60C 3/04
See application file for complete search history.

(56) References Cited

U.S. PATENT DOCUMENTS 6,443,201 B1     9/2002   Colantonio et al.

FOREIGN PATENT DOCUMENTS

| JP | 2000-190706 | * | 7/2000 |
| JP | 2001 191730 | | 7/2001 |

(Continued)

OTHER PUBLICATIONS

Severine Alibeau: Le premiere prototype de pneu pour vehicule electrique signe Michelin, XP002691190 http://www.caradisiac.com/Le-premier-prototype-de-pneu-pourvehicle-electrique-signe-Michelin-6001.htm, Sep. 22, 2009.

*Primary Examiner* — Justin Fischer
(74) *Attorney, Agent, or Firm* — Cozen O'Connor

(57) ABSTRACT

Tire having a load index LI, as defined in the ETRTO Standards Manual 2010, lying in the range between 65 and 105. The tire comprises a tread and an under layer (48) extending over the whole width of the tread and having an average radial height greater than 20% of the average radial height of the tread and a maximum value of tan δ at 23° C. and 10 Hz less than the corresponding value of the tread.

(Continued)

Radial carcass reinforcement (60) extends from the beads across the sidewalls as far as the crown. The tire has an outside diameter OD and a nominal section width SW, as defined in the ETRTO Standards Manual 2010, that satisfy the following inequality: $OD/SW > -0.00082641\ LI^2 + 0.11266\ LI - 0.185$.

1 Claim, 5 Drawing Sheets

(51) Int. Cl.
    *B60C 3/02*     (2006.01)
    *B60C 3/04*     (2006.01)
    *B60C 11/03*     (2006.01)
    *B60C 13/00*     (2006.01)
    *B60C 15/00*     (2006.01)

(52) U.S. Cl.
    CPC ............ *B60C 11/03* (2013.01); *B60C 11/033* (2013.04); *B60C 13/00* (2013.01); *B60C 15/00* (2013.01); *B60C 2011/0025* (2013.04); *B60C 2011/0355* (2013.04)

(56) References Cited

FOREIGN PATENT DOCUMENTS

| | | | |
|---|---|---|---|
| WO | WO 80/00236 | * | 2/1980 |
| WO | WO 2009/153821 | | 12/2009 |

* cited by examiner

OPTIMISED TIRE

RELATED APPLICATIONS

This is a U.S. national stage under 35 USC §371 of application No. PCT/EP2013/062026, filed on Jun. 11, 2013. This application claims the priority of French application no. 1257045 filed Jun. 20, 2012, and of U.S. provisional application Ser. No. 61/715,996 filed Oct. 19, 2012, the entire content of all of which are hereby incorporated by reference.

FIELD OF THE INVENTION

The present invention relates to tires for passenger vehicles.

BACKGROUND OF THE INVENTION

Research into tires the use of which permits a reduction in the energy consumption of the vehicle is today becoming increasingly important. Among the promising avenues being explored by tire manufacturers, one may cite the reduction in the rolling resistance of tires, in particular by the use of low-hysteresis materials, but also the reduction of the tire mass.

It has been proposed to reduce the mass of tires by reducing the material thicknesses and the densities of the reinforcing elements (use of textile cords) or the compounds, or by using reinforcing elements allowing to reduce certain volumes of compounds, for example at the level of the bead. Such solutions are discussed, for example, in patent U.S. Pat. No. 6,082,423 and in the documents mentioned in that document. Another way of reducing the mass of the tire consists in the overall reduction of its dimensions.

In spite of all the advances made in the course of recent years, there remains a major need for a further reduction in the rolling resistance of the tires while maintaining, or even improving, other performance characteristics such as their resistance to wear, their grip or their road behaviour. The present invention seeks to meet this need.

SUMMARY OF THE INVENTION

One of the objects of the present invention is to provide a tire having a low rolling resistance without impairing the other essential performance characteristics of the tire.

This object is achieved by the specific dimensioning of the tire, corresponding to a tire which could be described as being "tall and narrow", associated with a special geometry of its crown and its tread pattern.

More precisely, this object is achieved by a tire having a load index LI, as defined in the "ETRTO Standards Manual 2010", lying in the range between 65 (corresponding to a maximum load of 290 kg) and 105 (corresponding to a maximum load of 925 kg), the tire comprising: two beads intended to enter into contact with a mounting rim, each bead comprising at least one annular reinforcement structure defining a median plane perpendicular to the axis of rotation of the tire and being equidistant from the annular reinforcement structures of each bead; two sidewalls extending the beads radially towards the outside, the two sidewalls coming together in a crown comprising a crown reinforcement, radially surmounted by a tread provided with a tread pattern formed by motifs in relief, the tread comprising a rolling surface, wherein the tread is made from at least one first rubber composition having a maximum value of tan δ at 23° C. and 10 Hz, determined by scanning the shear strain rate, greater than or equal to 0.1 and less than or equal to 0.4, and a Shore A hardness that is greater than or equal to 55 and less than or equal to 65, and preferably greater than or equal to 57 and less than or equal to 62; an under layer extending over the whole of the axial width of the tread and arranged radially between the tread and the crown reinforcement, the average radial height of the under layer being greater than or equal to 20% of the average radial height of the tread, the under layer being made from a second rubber composition, the maximum value of tan δ at 23° C. and 10 Hz, determined by scanning the shear strain rate, of this second rubber composition being less than that of the said at least one first rubber composition from which the tread is made; and at least one radial carcass reinforcement extending from the beads across the sidewalls as far as the crown. The tire has an outer diameter OD and a nominal section width SW, as defined in the "ETRTO Standards Manual 2010". This manual stipulates in particular that the section width must correspond to the "linear distance between the outsides of the sidewalls of an inflated tire, excluding elevations due to labelling (markings), decorations, or protective bands or ribs", and defines the "nominal section width" as the "section width of an inflated tire mounted on its theoretical rim and indicated in the tire size designation". In a tire according to the invention, the outside diameter OD and the nominal section width SW are selected in a such a way that the following inequality is satisfied:

$$OD/SW \geq -0.00082641\ LI^2 + 0.11266\ LI - 0.185.$$

The implementation of the architecture of a tire having a given load index LI, an outside diameter OD and a nominal section width SW satisfying this inequality is within the reach of those skilled in the art reading the above disclosure.

More preferably, the outside diameter OD and the nominal section width SW are selected in such a way that the following inequality is satisfied:

$$OD/SW \geq -0.00070433\ LI^2 + 0.092036\ LI + 0.8453.$$

Furthermore, in a tire according to an embodiment of the invention, the average depth of the tread pattern, in an axial zone of the tread having a width equal to two thirds of the axial width of the tread and being centred about the median plane, is greater than or equal to 4.5 mm and less than or equal to 7 mm, and is preferably less than or equal to 6.5 mm, and the voluminal cavity ratio of the tread pattern is greater than or equal to 15% and less than or equal to 25%, and is preferably less than or equal to 23%.

These characteristics have a functional link because the dimensional choice of the tire (that is to say the choice of the outside diameter OD and of the nominal section width SW) leads to an improvement in its performance on a wet surface. The choice of a reduced voluminal cavity ratio of the tread pattern permits this advantage to be transformed into an improvement in wear, and the choice of a reduced average depth of the tread pattern in turn permits the improvement in wear to be transformed into an improvement in rolling resistance.

Finally, in a tire according to an embodiment of the invention, in any radial cross section, the transverse radius of the tread, defined as the radius of the circle passing through the two axial extremities of the rolling surface and through the intersection of the rolling surface with the median plane of the tire, is greater than or equal to the nominal section width SW.

DETAILED DESCRIPTION OF THE DRAWINGS

Figure 1:
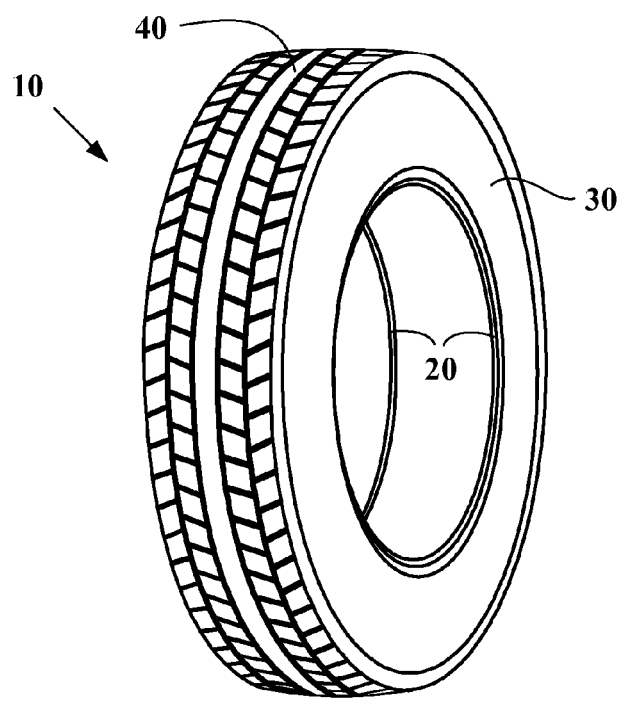
FIG. 1 is a schematic diagram that depicts a tire according to the prior art.

When using the term "radial", a distinction must be drawn between several different uses of the word by a person skilled in the art. First, the expression refers to a radius of the tire. It is in this sense that a point P1 is said to be "radially inside" a point P2 (or "radially on the inside" of point P2) if it is closer to the axis of rotation of the tire than point P2. Conversely, a point P3 is said to be "radially outside" a point P4 (or "radially on the outside" of point P4) if it is further from the axis of rotation of the tire than point P4. One can be said to advance "radially towards the inside (or the outside)" as one advances in the direction of the smaller (or larger) radii. This sense of the term also applies in the case of radial distances.

By contrast, a thread or a reinforcement is said to be "radial" when the thread or the reinforcing elements of the reinforcement form an angle greater than or equal to 80° and less than or equal to 90° with the circumferential direction. It should be noted that, in the present document, the term "thread" must be understood in an entirely general sense and includes the threads occurring in the form of monofilaments, multifilaments, a cable, a yarn or an equivalent assembly and, this being the case, irrespective of the nature of the material constituting the thread or the surface treatment used to enhance its bonding to the rubber.

Finally, the expression "radial section" or "radial cross section" is understood here to denote a section or a cross section in a plane which contains the axis of rotation of the tire.

An "axial" direction is a direction parallel to the axis of rotation of the tire. A point P5 is said to be "axially inside" a point P6 (or "axially on the inside" of point P6) if it is closer to the median plane of the tire than point P6. Conversely, a point P7 is said to be "axially outside" a point P8 (or "axially on the outside" of point P8) if it is further from the median plane of the tire than point P8. The "median plane" of the tire is the plane which is perpendicular to the axis of rotation of the tire and which is equidistant from the annular reinforcement structures of each bead. When it is stated that the median plane separates the tire, in any radial cross section, into two "halves" of the tire, this does not mean that the median plane necessarily constitutes a plane of symmetry of the tire. The expression "half of the tire" has a broader significance here and indicates a portion of the tire having an axial width close to half of the axial width of the tire.

A "circumferential" direction is a direction which is perpendicular both to a radius of the tire and to the axial direction.

In the context of this document, the expression "rubber composition" indicates a composition of rubber comprising at least one elastomer and one filler.

In the present document, "tan δ" indicates a dynamic property that is well known to those skilled in the art. This property is measured on a viscoanalyzer of the Metravib VA4000 type using moulded test specimens produced from uncured compounds or bonded test specimens produced from cured compounds. Test specimens such as those described in standard ASTM D 5992-96 (version published in September 2006, initially approved in 1996) in Figure X2.1 (circular embodiment) are used. The diameter "d" of the test specimen is 10 mm (it, therefore, has a circular cross section of 78.5 mm$^2$), the thickness "L" of each of the portions of rubber compound being 2 mm, which gives a ratio "d/L" of 5 (unlike standard ISO 2856, referred to in the ASTM standard, paragraph X2.4, which stipulates a value d/L of 2).

A record is taken of the response of a test specimen of vulcanised rubber compound that is subjected to a simple alternating sinusoidal shear loading, at a frequency of 10 Hz and at a stabilized temperature of 23° C. The test specimen is acted upon symmetrically about its equilibrium position. It undergoes a scan in amplitude of deformation, from 0.1% to 50% (peak-to-peak; on the outward cycle; 12 measurements), and then from 50% to 0.1% (peak-to-peak; on the return cycle; 11 measurements). In particular the dynamic elastic shear modulus (or "dynamic modulus", G') and the viscous shear modulus (G") on the return cycle, as well as the loss factor "tan δ", which corresponds to the ratio G"/G', are calculated after each acquisition of data.

The "Shore A hardness" of the compositions after curing is assessed according to standard ASTM D 2240-86. The measurement is performed by means of a Bareiss laboratory hardness tester on test specimens having a thickness of 5 mm, at a temperature of 23±2° C. and a humidity of 50±10 HR. The load on the presser foot is 2.5 N, and the measurement time is 3 seconds. The minimum distance between two measurement points is 6 mm, and the minimum distance between any measurement point and the edges of the test specimen is 12 mm. The result is the average of 3 individual values.

The "surficial cavity ratio" of a tread designates the ratio between the total surface area of the cavities opening onto the rolling surface of the tread when new (unworn) and the total surface area of the tread, the latter including the surface areas of the cavities. The total surface area of the tread is equal to the product of the width of the tread (that is to say the distance separating its axial edges) and its circumferential length.

The "voluminal cavity ratio" is the ratio between the total volume of the cavities (open and hidden) and the total volume of the tread including the cavity volumes.

The "total volume of the cavities of a tread" is equal to the sum of all the volumes of the cavities in the tread, whether or not they open onto the rolling surface of the tread when new (unworn). The expression "cavity" is used to denote grooves, wells or hollows of any type, said hollows being designed to open onto the zone of contact with the road and to participate at some time in the drainage of the zone of contact.

The "total volume of the tread" is equal to the total volume of material capable of being worn away during driving before the user is obliged to remove the tire in order either to renew its tread by retreading, or to replace it with a new tire. The total volume of the tread is equal to the product of the width of the tread (that is to say the distance separating its axial edges on the rolling surface in the new state), its circumferential length and its "average thickness of wearable material".

A low voluminal cavity ratio indicates a low volume of cavities relative to the volume of the tread.

The conditions of use of the tire, as defined in particular by the E.T.R.T.O. standard, determine the reference inflation pressure corresponding to the load capacity of the tire indicated by its load index and its speed rating.

FIG. 1 depicts schematically a tire 10 according to the prior art. The tire 10 comprises a crown consisting of a crown reinforcement (invisible in FIG. 1) surmounted by a tread 40, two sidewalls 30 extending the crown radially towards the inside, as well as two beads 20 situated radially inside the sidewalls 30.

Figure 2:
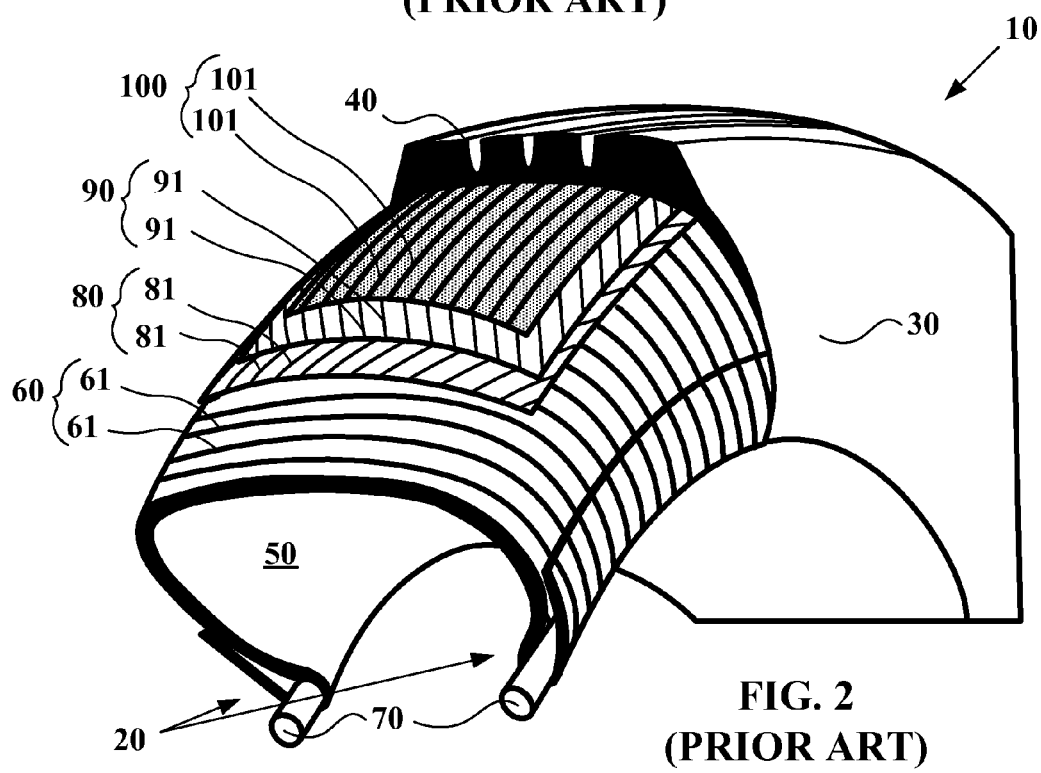
FIG. 2 is a schematic diagram that depicts a partial perspective view of the structure of a tire according to the prior art.

FIG. 2 depicts schematically a partial perspective view of another tire 10 according to the prior art and illustrates the different component parts of the tire. The tire 10 consists of a carcass reinforcement 60 comprising threads 61 coated with a rubber composition, and two beads 20, each comprising circumferential reinforcements 70 (in this case bead wires) which maintain the tire 10 on the rim (not illustrated). The carcass reinforcement 60 is anchored to each of the beads 20. The tire 10 further comprises a crown reinforcement consisting of two plies 80 and 90. Each of the plies 80 and 90 is reinforced by thread reinforcing elements 81 and 91 which are parallel in each layer and are arranged crosswise from one layer to the next, forming angles in the range between 10° and 70° with the circumferential direction. The tire additionally comprises a hoop reinforcement 100, arranged radially on the outside of the crown reinforcement, the hoop reinforcement being formed from reinforcing elements 101 that are oriented circumferentially and are spirally wound. A tread 40 is positioned on the hoop reinforcement; it is this tread 40 that assures the contact of the tire 10 with the road. The tire 10 illustrated here is a "tubeless" tire comprising an "inner liner" 50 made from a rubber composition that is impermeable to the inflation gas, covering the inner surface of the tire.

Figure 3:
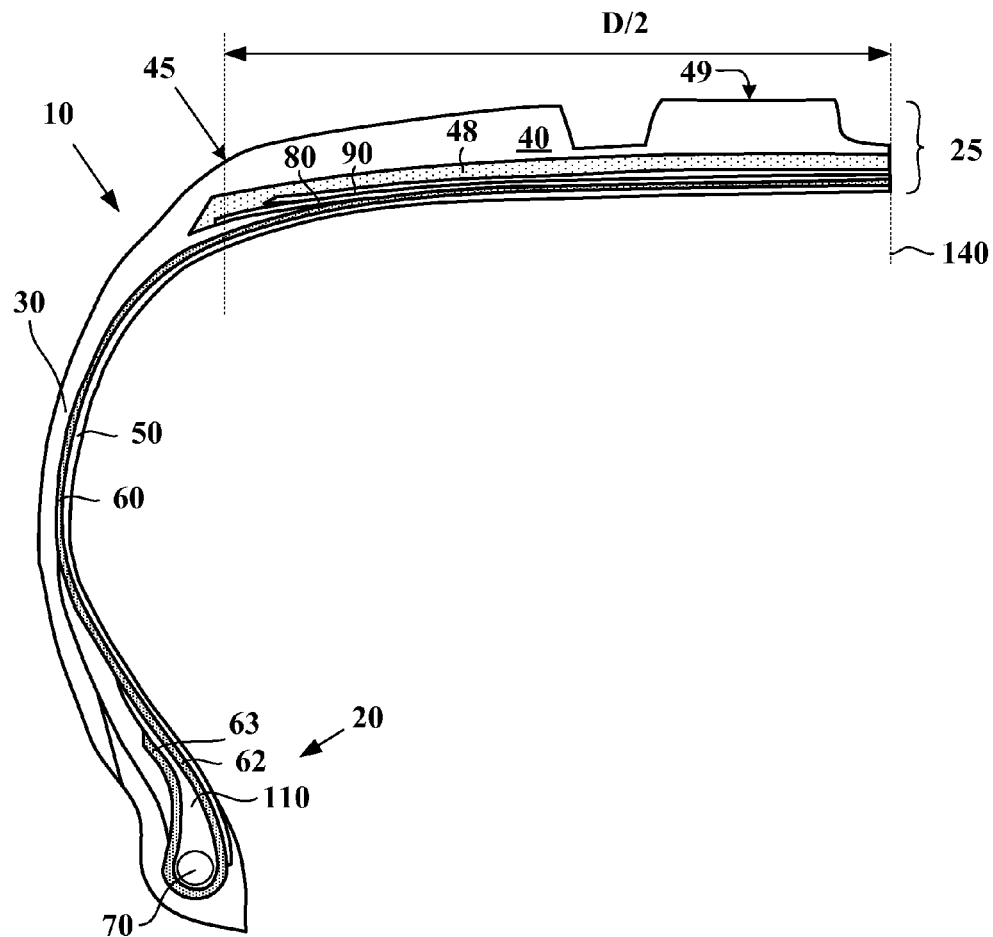
FIG. 3 is a schematic diagram that depicts, in radial cross section, a tire according to an embodiment of the invention.

FIG. 3 depicts, in radial cross section, a portion of a tire 10 according to the invention. This tire has a load index LI of 90, which corresponds to a maximum load of 600 kg. The tire comprises in particular two beads 20 designed to enter into contact with a mounting rim (not shown), each bead comprising at least one annular reinforcement structure (in this case, a bead wire 70) defining a median plane 140 perpendicular to the axis of rotation of the tire (not shown) and being situated equidistant from the annular reinforcement structures of each bead. The tire 10 also comprises two sidewalls 30 extending the beads 20 radially towards the outside, the two sidewalls coming together in a crown 25 comprising a crown reinforcement formed by two plies 80 and 90, radially surmounted by a tread 40 provided with a tread pattern formed by motifs in relief and comprising a rolling surface 49. The tread has an axial width D which corresponds to the distance between the axial edges of the tread 40, one of which edges, bearing the reference 45, is indicated in FIG. 3. In this case, the tire is symmetrical in relation to the median plane 140; consequently, the axial distance between the axial edge 45 and the median plane 140 is equal to D/2.

Figure 4:
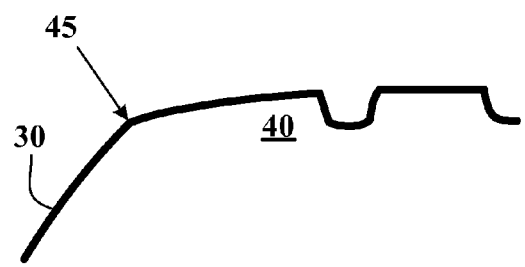
FIGS. 4 and 5 are schematic diagrams that illustrate how the axial edge of a tread is determined.
Figure 5:
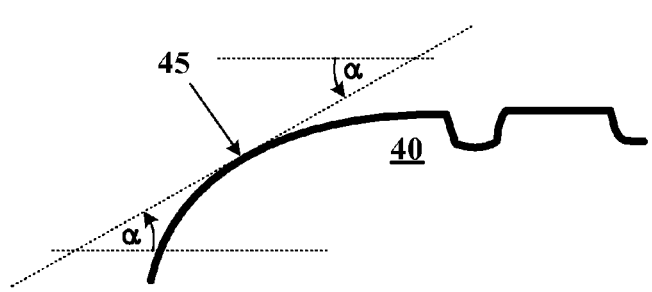

The manner in which the axial edges of a tread are determined is illustrated in FIGS. 4 and 5, each of which show the profile of a section of tread 40 and the part of the sidewall 30 adjacent to it. In certain tire architectures, the transition of the tread towards the sidewall is very clear, as in the case depicted in FIG. 4, and the determination of the axial edge 45 of the tread 40 is intuitive. There are some tire architectures, however, in which the transition between the tread and the sidewall is continuous. An example is depicted in FIG. 5. The edge of the tread is then determined as follows. The tangent to the rolling surface of the tire, in a radial section of the tire, is plotted at all points of the rolling surface in the zone of transition between the tread and the sidewall. The axial edge is the point at which the angle α (alpha) between the said tangent and an axial direction is equal to 30°. In the event of there being several points for which the angle α (alpha) between the said tangent and an axial direction is equal to 30°, the radially outmost of these points is used. The axial edge 45 has been determined in this way in the case of the tire depicted in FIG. 3.

The tread of this embodiment is made from a first rubber composition having a maximum value of tan δ at 23° C. and 10 Hz, determined by scanning the shear strain rate, equal to 0.27. Furthermore, the first rubber composition has a Shore A hardness equal to 60.

The tire 10 also comprises an under layer 48 extending over the entire axial width of the tread and arranged radially between the tread and the crown reinforcement. The average radial height of the under layer of this embodiment is equal to 25% of the average radial height of the tread. The under layer is made from a second rubber composition, the maximum value of tan δ at 23° C. and 10 Hz, determined by scanning the shear strain rate, of this second rubber composition being less than that of the said at least one first rubber composition from which the tread is made. In this embodiment, tan δ of the second rubber composition at 23° C. and 10 Hz is equal to 0.15.

A radial carcass reinforcement 60 extending from the beads 20 across the sidewalls 30 as far as the crown 25; it is anchored to the beads 20 by means of an upturn, in such a way as to form a main portion 62 and a wrapped-around portion 63. The volume formed between the main portion 62 and the wrapped-around portion 63 is occupied by a bead filler 110.

Figure 6:
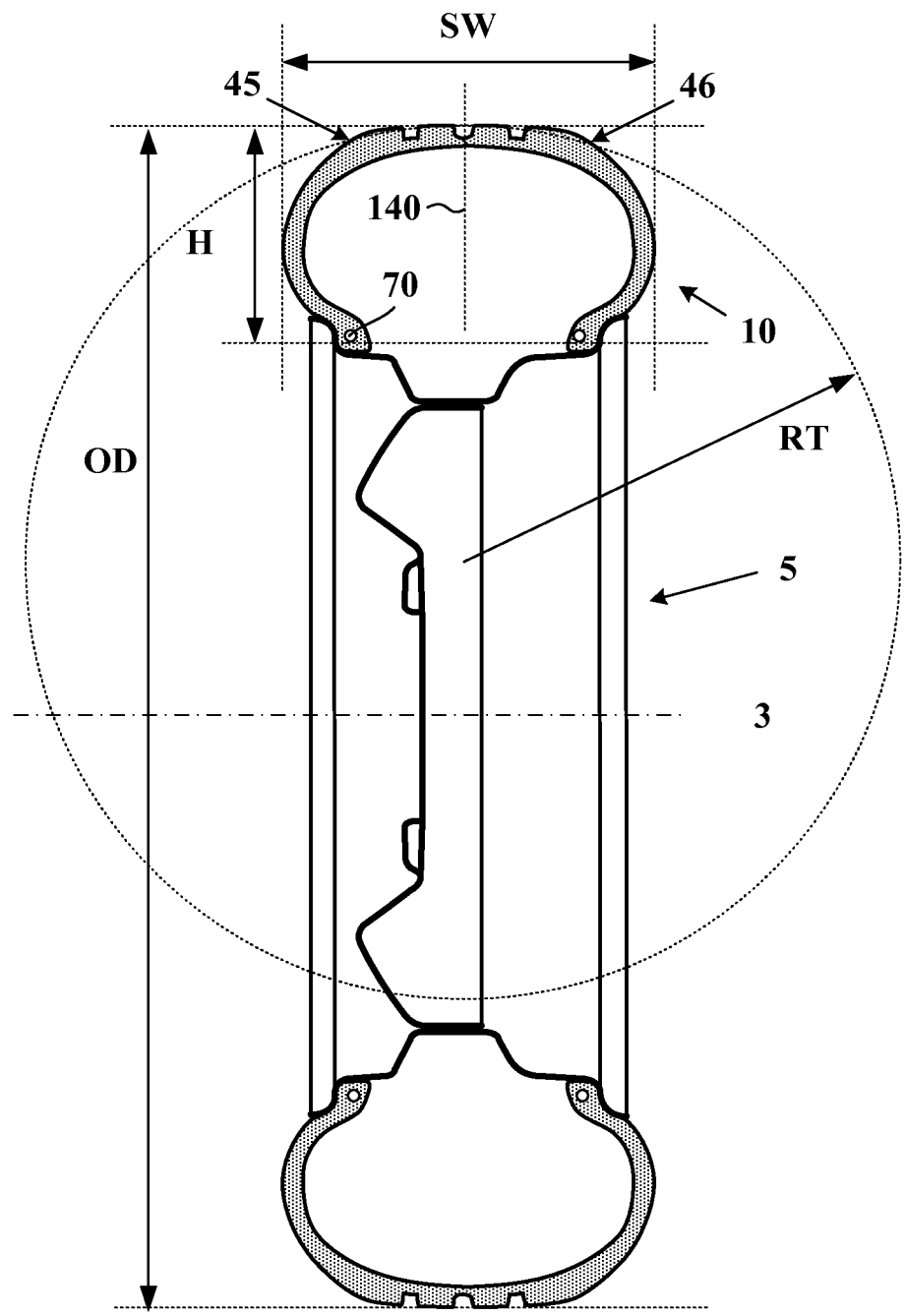
FIG. 6 is a schematic diagram that depicts, in radial cross section, a tire according to an embodiment of the invention fitted on its mounting rim.

FIG. 6 depicts, in radial section, the tire 10 of FIG. 3 after assembly on its mounting rim 5 and inflation to its operating pressure. The outside diameter OD and the nominal section width SW of the tire 10 are indicated. The section height H of the tire 10 is also indicated.

In this case, the rim width of the mounting rim, as defined in the ETRTO Standards Manual 2010, is greater than the nominal rim width of the tire, the difference being equal to 0.5 of an inch.

The tire 10 has an outside diameter OD and a nominal section width SW, as defined in the ETRTO Standards Manual 2010, in such a way that the following inequality is satisfied:

$$OD/SW > -0.00082641\ LI^2 + 0.11266\ LI - 0.185$$

Indeed, OD/SW=3.53, and $-0.00082641 \times 90^2 + 0.11266 \times 90 - 0.185 = 3.26$.

The tire also satisfies the preferential condition, according to which $$OD/SW > -0.00070433\ LI^2 + 0.092036\ LI + 0.8453$$

where $-0.00070433 \times 90^2 + 0.092036 \times 90 + 0.8453 = 3.42$.

Figure 7:
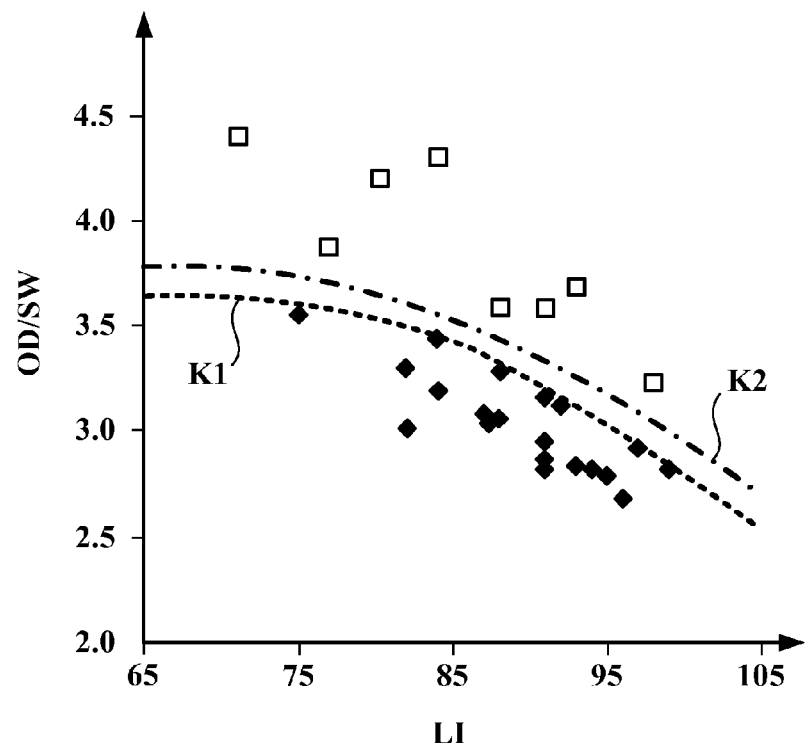
FIG. 7 is a graph that illustrates the inequality defining an aspect of a tire according to an embodiment of the invention.

The great majority of existing tires for passenger vehicles do not satisfy these conditions, as indicated in FIG. 7. The black diamonds correspond to passenger vehicle tires currently marketed by the applicant, and the squares correspond to tires according to the invention. The dotted curved line ("K1") corresponds to the function $$OD/SW > -0.00082641\ LI^2 + 0.11266\ LI - 0.185,$$

and the dash-dotted curve ("K2") corresponds to the function

OD/SW=−0.00070433 LI²+0.092036 LI+0.8453.

A tire which satisfies the condition corresponding to curve K2 is further removed from the currently marketed sizes of passenger vehicle tires than a tire which satisfies the condition corresponding to curve K1.

In the tire 10 of FIG. 3, the average depth of the tread pattern, in an axial zone of the tread having a width equal to two thirds of the axial width of the tread and being centred about the median plane, is 6.5 mm, and the voluminal cavity ratio of the tread pattern is equal to 20%. In the definition of the voluminal cavity ratio of the tread pattern provided above, the quantity "the average thickness of wearable material" is used. These concepts are illustrated in FIG. 8.

Figure 8:
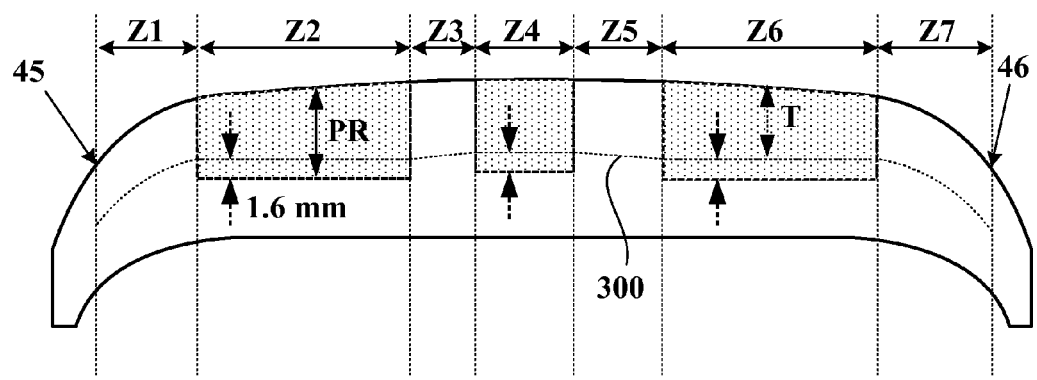
FIG. 8 is a schematic diagram that illustrates the concept of tread pattern depth.

FIG. 8 illustrates a crown of a tire in a schematic manner. For each axial position, the radial depth PR of the deepest incision present over the whole circumference of the tire is considered. The tire depicted in FIG. 8 comprises a central channel (axial zone Z4) and a series of transverse incisions (axial zones Z2 and Z6). The depth of the central channel determines the value of the radial depth PR in the axial zone Z4, and the depth of the transverse incisions determines the corresponding values in the axial zones Z2 and Z6. The thickness T of wearable material is defined as T=PR (in mm)−1.6, since regulations are in force which require a minimum depth of 1.6 mm for the incisions; tread wear indicators are present in most tires to indicate that this minimum depth has been reached and that the tire should be replaced or regrooved. When no incision is present for the whole of the circumference of the tire in an axial zone that is present between two axial zones containing incisions—in this case, this is true of zones Z3 and Z5—then the thickness T of wearable material in this zone is obtained by interpolating the values found in the adjacent axial zones (see the dotted line in zones Z3 and Z5). When no incision is present for the whole of the circumference of the tire in a marginal axial zone—in this case, this is true of zones Z1 and Z7—then the thickness T of wearable material is defined as the thickness T of the adjacent axial zone which contains incisions, in the axial position of the interface between the zones (see the dotted line in zones Z1 and Z7).

The maximum depth of the tread pattern corresponds to the maximum value of the radial depth PR over the whole of the axial extent of the tread.

FIG. 6 also shows the transverse radius RT of the tread, defined as the radius of the circle passing through the two axial extremities 45 and 46 of the tread and through the intersection of the rolling surface with the median plane 140 of the tire. The transverse radius RT is clearly greater than the nominal section width SW.

Figure 9:
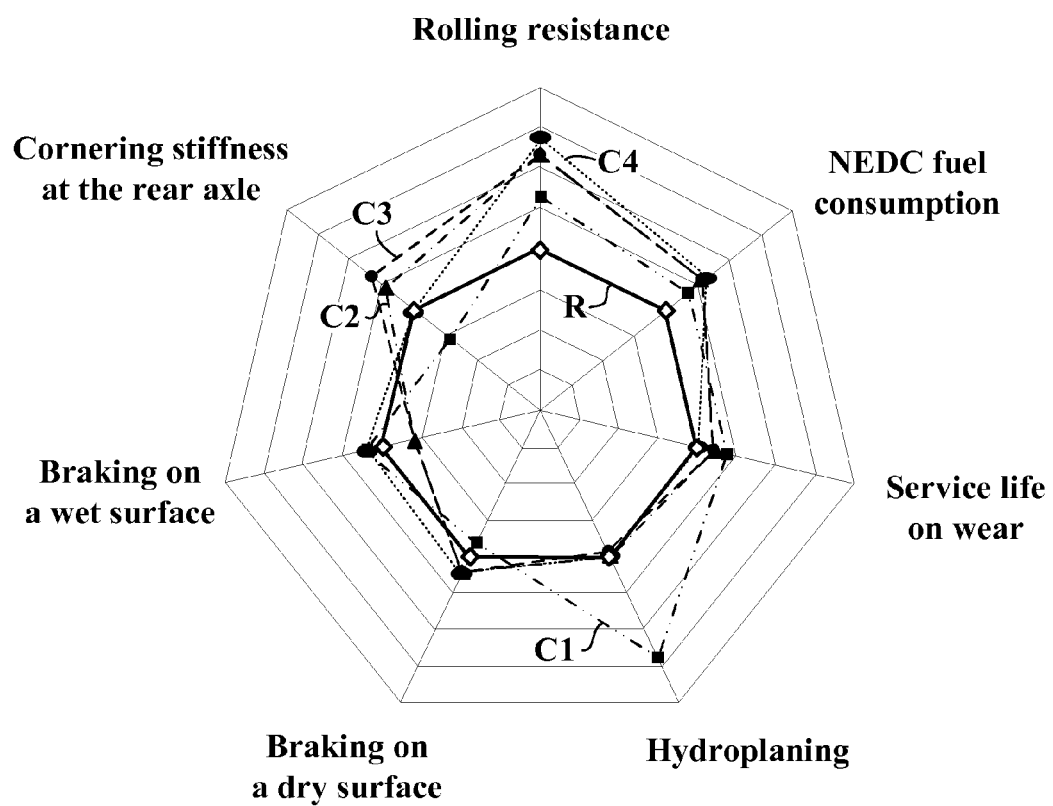
FIG. 9 is a graph that shows the results of comparative calculations.

The applicant has performed comparative calculations and tests so as to compare tires according to the invention and reference tires. FIG. 9 illustrates such calculation results, obtained by multi-performance expert software, in the form of a Kiviat diagram for seven tire performance parameters, namely the rolling resistance; NEDC (New European Driving Cycle) fuel consumption; resistance to wear; hydroplaning; braking on a dry surface and on a wet surface, and the cornering stiffness at the rear axle. The results obtained for the reference tire, of size 205/55 R16, are indicated with the help of diamonds (curve "R"; continuous line) and constitute the reference value (100). The centre of the diagram corresponds to a relative value of 80, and its outside contour corresponds to a value of 120. The curve "C1" (square symbol, dash-dotted line) corresponds to a tire that is narrower and of greater diameter (size 185/60 R 18) having the same architecture as the reference tire; a clear improvement can be observed from the point of view of hydroplaning and rolling resistance; the NEDC fuel consumption and the resistance to wear are better, although the performance is reduced in terms of braking on a wet surface, and the cornering stiffness at the rear axle is also reduced. When this tire is provided with a tread pattern according to the invention (that is to say a depth and a voluminal cavity ratio as claimed), a highly significant improvement is obtained in the cornering stiffness at the rear axle (curve "C2", dash-dotted line, symbol: triangle), and this cornering stiffness is further increased when the tire is fitted to a wider rim (curve "C3", dashed line, symbol: circle). The use of rubber compositions having a tan δ at 23° C. and 10 Hz, determined by scanning the shear strain rate, in the claimed domain also permits a further improvement to be achieved in the compromise between performance parameters (curve "C4", dotted line, symbol: ellipse). The results of these calculations have subsequently been confirmed in comparative tests.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire having a load index LI, as defined in the ETRTO Standards Manual 2010, lying in the range between 65 and 105, the tire comprising:

two beads designed to enter into contact with a mounting rim, each bead comprising at least one annular reinforcement structure, defining a median plane perpendicular to the axis of rotation of the tire and being situated equidistant from the annular reinforcement structures of each bead;

two sidewalls extending the beads radially towards the outside, the two sidewalls coming together in a crown comprising a crown reinforcement, radially surmounted by a tread provided with a tread pattern formed by motifs in relief, the tread comprising a rolling surface, wherein the tread is made from at least one first rubber composition having a maximum value of tan δ at 23° C. and 10 Hz, determined by scanning the shear strain rate, that is greater than or equal to 0.1 and less than or equal to 0.4, and a Shore A hardness that is greater than or equal to 55 and less than or equal to 65;

an under layer extending over the whole of the axial width of the tread and arranged radially between the tread and the crown reinforcement, the average radial height of the under layer being greater than or equal to 20% of the average radial height of the tread, the under layer being made from a second rubber composition, the maximum value of tan δ at 23° C. and 10 Hz, determined by scanning the shear strain rate, of this second rubber composition being less than that of the said at least one first rubber composition from which the tread is made;

at least one radial carcass reinforcement extending from the beads across the sidewalls as far as the crown;

the tire having an outside diameter OD and a nominal section width SW, as defined in the ETRTO Standards Manual 2010, in such a way that the following inequality is satisfied:

$$OD/SW > -0.00082641\ LI^2 + 0.11266\ LI - 0.185$$

wherein the average depth of the tread pattern, in an axial zone of the tread having a width equal to two thirds of the axial width of the tread and being centred about the median plane, is greater than or equal to 4.5 mm and less than or equal to 7 mm;

wherein the voluminal cavity ratio of the tread pattern is greater than or equal to 15% and less than or equal to 25%; and wherein, in any radial cross section, the transverse radius (RT) of the tread, defined as the radius of the circle passing through two axial extremities of the tread and through the intersection of the rolling surface with the median plane of the tire, is greater than or equal to the nominal section width SW.

* * * * *